US006197238B1

(12) United States Patent
Wang et al.

(10) Patent No.: US 6,197,238 B1
(45) Date of Patent: Mar. 6, 2001

(54) METHODS FOR MAKING UNMODIFIED POLYVINYL ALCOHOL FIBERS

(75) Inventors: James Hongxue Wang, Appleton, WI (US); David Michael Schertz, Roswell, GA (US); William S. Pomplun, Neenah, WI (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 0 days.

(21) Appl. No.: 09/495,434

(22) Filed: Jan. 31, 2000

Related U.S. Application Data

(62) Division of application No. 09/088,352, filed on Jun. 1, 1998, now Pat. No. 6,020,425.

(51) Int. Cl.[7] .............................. B29C 47/00; D01F 6/00; D01F 6/14
(52) U.S. Cl. ....................... 264/176.1; 264/184; 264/185; 525/56; 525/62; 428/357; 428/364; 428/394; 428/401
(58) Field of Search ................... 525/56, 62; 428/394, 428/401, 357, 364; 264/176.1, 184, 185

(56) References Cited

U.S. PATENT DOCUMENTS

| | | | |
|---|---|---|---|
| 1,971,662 | 8/1934 | Schmidt et al. | 525/56 |
| 2,386,347 | 10/1945 | Roland, Jr. | 525/56 |
| 3,099,646 | 7/1963 | Scardiglia et al. | 525/61 |
| 3,850,901 * | 11/1974 | Tanaka et al. | 264/185 |
| 3,888,662 | 6/1975 | Boeckeler | 264/56 |
| 3,985,849 | 10/1976 | Notomi et al. | 264/567 |
| 4,071,454 * | 1/1978 | Yamamoto et al. | 264/185 |
| 4,536,532 | 8/1985 | Miller et al. | 524/141 |
| 4,672,087 | 6/1987 | Miller et al. | 524/141 |
| 4,828,915 | 5/1989 | Schroeder et al. | 428/332 |
| 4,851,168 * | 7/1989 | Graiver et al. | 264/185 |
| 4,927,586 * | 5/1990 | Smook et al. | 264/176.1 |
| 5,030,404 | 7/1991 | Bonnebat et al. | 264/185 |
| 5,051,222 * | 9/1991 | Marten et al. | 264/185 |
| 5,133,916 * | 7/1992 | Dano et al. | 264/185 |
| 5,189,097 | 2/1993 | LaFleur et al. | 525/57 |
| 5,229,057 * | 7/1993 | Ohmory et al. | 264/185 |
| 5,332,774 | 7/1994 | Klang et al. | 524/371 |
| 5,340,522 * | 8/1994 | Taniguchi et al. | 264/185 |
| 5,419,109 * | 5/1995 | Taniguchi et al. | 264/185 |
| 5,504,154 | 4/1996 | Amici et al. | 525/57 |
| 5,712,334 | 1/1998 | Watanabe et al. | 524/161 |

FOREIGN PATENT DOCUMENTS

| | | |
|---|---|---|
| 0 488 779 | 6/1992 | (EP) . |
| WO 93/00210 | 1/1993 | (WO) . |
| WO 94/29188 | 12/1994 | (WO) . |

OTHER PUBLICATIONS

Patent Abstracts of Japan, JP 05–310955 (Nippon Synthetic Chem Ind Co Ltd), Nov. 22, 1993.

Database WPI, JP 51–030591 (Electro Chem Ind KK), Sep. 1, 1976.

* cited by examiner

*Primary Examiner*—P. Hampton-Hightower
(74) *Attorney, Agent, or Firm*—Kilpatrick Stockton, LLP

(57) ABSTRACT

This invention relates, in general, to thermoplastic film and fiber structures and methods of making the same. More specifically, this invention relates to substantially water-free films and fibers comprising unmodified polyvinyl alcohol.

21 Claims, No Drawings

METHODS FOR MAKING UNMODIFIED POLYVINYL ALCOHOL FIBERS

This is a Divisional of prior application No: 09/088,352 filed Jun. 1, 1998, now U.S. Pat. No. 6,020,425

FIELD OF THE INVENTION

This invention relates, in general, to thermoplastic film and fiber structures and methods of making the same. More specifically, this invention relates to substantially water-free films and fibers comprising unmodified polyvinyl alcohol.

BACKGROUND OF THE INVENTION

Polyvinyl alcohol (PVOH) is a commodity polymer that is used in a wide variety of different applications. However, PVOH is generally regarded as non-thermoplastic. PVOH has a high melting point of about 200° C. depending on the degree of hydrolysis. As PVOH is heated near its melting point, yellowing and discoloration occur. Therefore, when using PVOH as a base material for thermoplastic applications, the PVOH must usually be modified.

Modified PVOH is used in many different water-dispersible thermoformable articles, such as fibers, films and fabrics which maintain their integrity and strength when in use, but dissolve and disperse when placed in contact with water. Unmodified PVOH is used in industry for many different solution-based applications and is not generally considered to be thermoformable or melt-processable. Some such applications for unmodified PVOH include warp sizing in textiles, fabric finishing, adhesives, paper processing additives, and emulsifiers/dispersants.

The prior art has demonstrated some success in modifying PVOH for use in thermoplastic applications. By "modified" PVOH, it is meant PVOH resin which has been chemically modified, including PVOH having another compound grafted thereto, or PVOH resin which has been mixed with one or more plasticizers. In each instance, these "modifications" have been needed to permit PVOH to be used in thermoformable articles.

To overcome the thermoplastic processing problems, chemically modified PVOH has been used. Some prior art teachings have used ethers of PVOH, ethoxylated PVOH or lacton-modified PVOH to produce thermoformable articles.

The prior art has also used PVOH that has not been modified structurally by adding a plasticizing agent to the PVOH which permits the PVOH to be extruded into films and fibers. Examples of plasticizers include water, ethylene glycol, glycerin and ethanolamine.

However, there are problems associated with the addition of plasticizers to PVOH. One of the most pronounced problems during processing is the fogging of the volatile plasticizer during the melt extrusion and condensing of vapor and effects of the vapor to the operating environment. In addition, the extruded articles such as films or fibers lose the plasticizers since the plasticizer molecules diffuse out of the film or fibers. This causes the films or fibers to become brittle over time and often causes the article to fail.

Accordingly, what is needed is an unmodified PVOH that may be thermoplastically formed into films and fibers which can then be used in the production of water-dispersible, flushable articles without the use of plasticizing agents. These fibers, films and fabrics could be used in products such as personal care products, diapers, feminine napkins, wipes, incontinence products, release liners, product packaging, etc., which contain the above-mentioned fibers, films and fabrics.

SUMMARY OF THE INVENTION

One object of the present invention is to produce films and fibers comprising unmodified PVOH.

Another object of the present invention is to use unmodified PVOH in films and fibers without the use of a plasticizing agent.

These and other objects are satisfied by the present invention. The present invention discloses the selection and use of commercially-available grades of PVOH for thermoplastic applications. "Thermoplastic" is defined, herein, as a resin which can be melted and easily extruded to form a desired article, i.e., the material is melt processable.

PVOH is a commodity polymer, commonly used in solution-based applications. Since it is a commodity polymer, thermoplastic articles made using unmodified PVOH are generally less expensive than articles made using modified PVOH due to the additional process steps required to modify the PVOH. Also, unmodified PVOH is, in general, less expensive than other water-soluble polymers.

In its unmodified form, PVOH has not been used for thermoplastic applications. Typically, some modification of the PVOH, such as chemical grafting or addition of plasticizer, is necessary to achieve melt processability for PVOH. In the present invention, a window of thermoplastic processability has been discovered and defined for unmodified, commercially-available PVOH, according to: 1) the composition or % hydrolysis of the PVOH, 2) the molecular weight of the PVOH, 3) the solution viscosity of the PVOH, or 4) the melt viscosity of the PVOH. The selected grades of PVOH have demonstrated thermoplasticity, allowing for continuous, melt extrusion or conversion into thin films in a continuous, extrusion process.

These grades of PVOH are also useful for melt spinning of fibers, injection molding or other thermoplastic applications. Extruded films of the unmodified PVOH described herein have very high strength and modulus, excellent clarity, and fast crystallization and solidification rates. The advantages of melt processing a thermoplastic, unmodified PVOH into a useful, strong, clear, water-soluble article are evident. Melt processing is a desirable thermoforming process compared to solution processing. Melt processing eliminates the need to add steps such as chemical grafting, addition of a plasticizer, or other modification in order to achieve melt processability.

DETAILED DESCRIPTION

PVOH is generally produced by a two step process as shown in Scheme 1. Since vinyl alcohol is not a stable monomer, the polymerization of vinyl alcohol is not an option for making PVOH. Instead, the process utilizes a readily available monomer, vinyl acetate, as the starting point. The first step is the polymerization of vinyl acetate into polyvinyl acetate (PVA). The second step is the hydrolysis or alcoholysis of PVA into a copolymer of vinyl acetate and vinyl alcohol, or polyvinyl alcohol (PVOH). Depending on the hydrolysis level as defined in the equation in Scheme 1, a wide range of PVOH copolymers can be produced when the hydrolysis reaction is allowed to reach certain conversion levels.

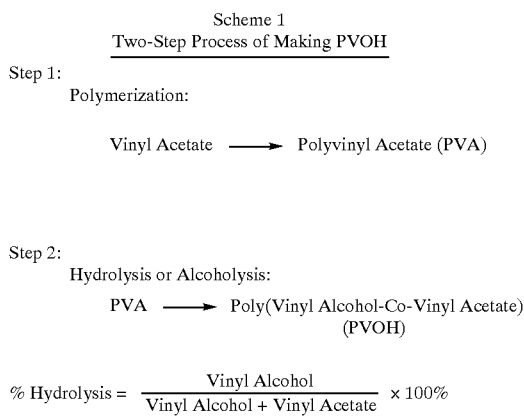

Scheme 1
Two-Step Process of Making PVOH

Step 1:
  Polymerization:

Vinyl Acetate ⟶ Polyvinyl Acetate (PVA)

Step 2:
  Hydrolysis or Alcoholysis:

PVA ⟶ Poly(Vinyl Alcohol-Co-Vinyl Acetate) (PVOH)

$$\% \text{ Hydrolysis} = \frac{\text{Vinyl Alcohol}}{\text{Vinyl Alcohol} + \text{Vinyl Acetate}} \times 100\%$$

For PVOH, the degree of hydrolysis is controlled during the alcoholysis reaction and,is independent of the control of the molecular weight of the PVOH formed. Fully hydrolyzed PVOH is obtained if alcoholysis is allowed to go to completion. The reaction is terminated by removing or neutralizing the sodium hydroxide catalyst used in the process. Typically, a small amount of water is added to the reaction vessel to promote the saponification reaction of PVA. The extent of hydrolysis is inversely proportional to the amount of water added. The alcoholysis can be carried out in a highly agitated slurry reactor. A fine precipitate forms as PVA, which is then converted to PVOH. The PVOH product is then washed with methanol and is filtered and dried to form a white, granular powder.

The molecular weight of the PVOH is controlled by the polymerization condition of vinyl acetate. Many properties of PVOH depend on the degree of hydrolysis and the molecular weight. As the molecular weight increases, the solution viscosity, tensile strength, water resistance, adhesive strength, and solvent resistance increase. As molecular weight decreases, the flexibility, water solubility, and ease of solvation increase. As the degree of hydrolysis increases, the water resistance, tensile strength, block resistance, solvent resistance, and adhesion to polar substrates increase. As the degree of hydrolysis decreases, the water solubility, flexibility, water sensitivity and adhesion to hydrophobic substrates increase.

Due to the strong dependence of PVOH on the molecular weight and degree of hydrolysis, PVOH is typically supplied in combination of these two parameters. PVOH is classified into 1) partially hydrolyzed (87.0 to 89.0% hydrolysis); 2) intermediately hydrolyzed (95.5 to 96.5% hydrolysis); 3) fully hydrolyzed (98.0 to 98.8% hydrolysis); and 4) super hydrolyzed (>99.3% hydrolysis). Within each category of PVOH, the resin is differentiated by solution viscosity, measured at 4% solution in water at 20° C. in centipoise. The viscosity is used as a molecular weight measure since solution viscosity is typically related to the molecular weight by the well known Mark-Houwink equation:

$$\eta = KM_v^a$$

wherein
  $\eta$ = intrinsic viscosity
  K = constant (dependent upon the polymer)
  $M_v$ = molecular weight
  a = factor based on the rigidity of the polymer chains and is dependent on the polymer.

For the unmodified PVOH, it was known that higher molecular weight grades were not thermoplastic. It was surprising that unmodified PVOH at lower molecular weights would be thermoplastic based on the non-melt processability of higher molecular weights grades. Unmodified PVOH with weight average molecular weight as low as 8750 g/mole Was discovered to be thermoplastic and melt processable, with high melt strength, excellent film strength and great clarity. Typically, a polymer with such a low starting molecular weight would not be expected to be melt processable into a useful material.

Additionally, it was discovered that the melt viscosity-of the PVOH grades could be used to determine which grades of PVOH were thermoplastic. In general, those grades having a melt viscosity less than about 1500 Pa·s at a shear rate of 500 s$^{-1}$ were determined to be melt processable.

Not all grades of PVOH were discovered to be thermoplastic. The PVOH grades useful for this invention preferably have a solution viscosity of less than about 10 cp in a 4% water solution at 20° C. and a hydrolysis of less than about 90%. Examples of commercially-available grades of PVOH useful in this invention are ELVANOL® 51-05 from DuPont (Wilmington, Del.), AIRVOL® 203 and 205 from Air Products and Chemical, Inc. (Allentown, Pa.), and GOHSENOL® KP-06 from Nippon Gohsei (Japan). PVOH is typically sold in powder or granule form, however pellets or other forms of resin can be used in this invention since the physical form of PVOH does not affect melt processability.

Additionally, depending on the type of application for which the PVOH will be used, films or fibers, the exact processing characteristics may vary. For example, some of the thermoplastic grades may be better suited for the production of thermoplastic films while other grades may be more useful for the production of fibers. The exact grade to use will depend upon the item being made.

The thermoplastic PVOH grades may be extruded using most known extruding devices. In general, while a thermoplastic film may be extruded at extrusion temperatures above the melting point of the PVOH, it is preferred to use extrusion temperatures near the melting point as the resulting films and fibers are generally clearer, have fewer imperfections, are more ductile and stronger, and can be drawn into. much thinner films.

As discussed earlier, the films and fibers of the present invention can be extruded from unmodified PVOH without the use of a plasticizer. Many different plasticizers are known, including, for example, ethylene glycol, glycerines and ethanolamine. In addition to these plasticizers, water is also known to be used as a plasticizer in the production of PVOH films and fibers. However, these plasticizers, including water, have several disadvantages when used in the production of films and fibers. In general, plasticizers, including water, will slowly diffuse out of a PVOH film or fiber causing the film or fiber to become lucid and brittle and therefore more likely to break or shatter.

Additionally, plasticizers, including water, added to the PVOH may cause bubbling of the film during the extrusion process. This is especially true with water. Therefore, care must be taken prior to the production of the film to ensure that the PVOH powder or pellets remain substantially water-free. This helps to ensure that the films and fibers produced are also substantially water-free. By "substantially water-free" it is meant that the films and fibers produced using the unmodified PVOH grades contain less than about 2.0 percent by weight of water. Preferably, the films and fibers contain less than about 1.0 percent by weight of water. More preferably, the films and fibers contain less than 0.5 percent by weight of water.

The importance of this invention is that a method has been discovered for directly extruding PVOH into a water-soluble, thin film without the need for any chemical modification of the PVOH or the addition of a plasticizer. The elimination of any chemical modification of the PVOH eliminates the labor intensive step of chemically modifying or grafting the PVOH. The elimination of a plasticizer admixed with the PVOH relieves the common problems involved with plasticizers as previously discussed. The water-soluble film of the present invention will keep its original properties and in-use performance unlike PVOH film containing a plasticizer which will become brittle over time.

One additional advantage in the production of water-soluble products from the PVOH film of the present invention is in the product converting stage. PVOH has a higher melting point than many other water-soluble polymer systems used for making water-dispersible, flushable articles, including, for example, polyethylene oxide-based materials. PVOH film can withstand heat from a hot-applied melt adhesive which may be used during product construction. In contrast, PEO-based materials have limitations in this aspect due to the low melting temperature of the PEO of about 60 to 70° C. Therefore, the PVOH films of the present invention have great usefulness in the production of water-dispersible, flushable products.

The present invention is further illustrated by the following examples, which are not to be construed in any way as imposing limitations upon the scope thereof. On the contrary, it is to be clearly understood that resort may be had to various other embodiments, modifications, and equivalents thereof which, after reading the description herein, may suggest themselves to those skilled in the art without departing from the spirit of the present invention and/or the scope of the appended claims.

EXAMPLE 1

The melt processability of PVOH was first demonstrated by a twin-screw extrusion process. A Haake (Paramus, N.J.) TW-100 counter-rotating twin-screw extruder, fitted with a 4" cast film die was used. The extruder had a length of 300 mm. Each conical screw had a diameter of 30 mm at the feed port and a diameter of 20 mm at the die. A grade of relatively low degree hydrolysis from Nippon Gohsei, GOSHENOL® KP-06, was selected. This PVOH resin was manufactured for use as a dispersion agent for use in aqueous solution applications. It was not intended for melt processing. The degree of hydrolysis is 71–74%, it's viscosity in a 4% solution in water at 20° C. is 5 to 7 cp, as measured by Hoeppler falling ball method. It is supplied as a white granulate powder. To test the possibility for thermoplastic process, the resin was fed to the Haake twin-screw extruder directly without pelletization.

An extruded film was collected by a chilled wind-up roll. Initially, the screw speed was set at 134 rpm. The barrel temperatures were 150, 185, 185 and 190° C. for zones 1, 2, 3 and 4 (die) respectively. Due to intensive shear heating, the melt temperature was raised above the set temperature of the film die, reaching about 225° C. Under these conditions, it was surprising that a thick film of about 4–6 mil could be produced from this resin which is supposed to be non-thermoplastic. However, the quality of the film was poor and there were many holes in the film. The films were relatively hazy and not as clear at typical PVOH films. The film was extremely rigid and brittle. On the film there were many deep flow lines visually observable. The melt strength of PVOH under these conditions was weak. The PVOH film made under this temperature was discolored and appeared slightly yellowish.

EXAMPLE 2

In Example 2, the same PVOH resinused in Example 1 was tested to determine whether the film processing conditions could be improved. First, the extrusion temperature profile was modified. The barrel temperatures were set at 150, 185, 185 and 180 ° C. for zones 1, 2, 3 and 4 (die) respectively. The screw speed was maintained at 134 rpm. This lower die set temperature brought down the melt temperature to about 195 to 200° C. Surprisingly, as the melt temperature of the PVOH dropped, the film properties improved dramatically. At a melt temperature of about 195 to 200° C., the melt strength of PVOH improved greatly such that a PVOH film could be drawn down to less than 0.2 mil. In contrast to the hazy appearance of the PVOH made in Example 1, the PVOH film made in this example under the lower melt temperature had excellent clarity and was essentially free of film defects.

Compared to the PVOH film in Example 1, the film made at a lower temperature had greater strength and softness. The tensile properties of the pellet-derived PVOH film were tested on a Sintech 1/D tensile tester available from MTS Systems Corp. (Machesny Park, Ill.). The PVOH film had a high melt strength such that the winding up of the film at high speed did not cause any tearing or breaking of the PVOH film. The peak stress of the film was over 60 -MPa. The elongation-at-break of the PVOH was about 73%. The modulus of the film was also high, slightly over 1800 MPa.

EXAMPLE 3

The same PVOH resin used in Example 1 was used for this example. PVOH is usually delivered from the manufacture in a powdered form. Since polymers in the pellet form are generally easier to work with, an experiment was devised to see if cast films created directly from PVOH powder had different tensile properties that those created from PVOH in the pellet form. PVOH pellets were made by extruding PVOH powder on a Werner & Pfleiderer (Ramsey, N. J.) ZSK-30 extruder at 20 lb/hr and 300 rpm. The ZSK-30 extruder has a pair of co-rotating screws arranged in parallel with the center-to-center distance between the shafts of the two screws at 26.2 mm. The nominal screw diameters are 30 mm. The actual outer diameters of the screws are 30 mm and the inner screw diameters are 21.3 mm. The thread depths are 4.7 mm. The length of the screws are 1328 mm and the total processing section length was 1338 mm. This ZSK-30 extruder had 14 processing barrels which were numbered consecutively 1 to 14 from the feed barrel to the die. The first barrel was not heated, but cooled by water. Barrels 2 to 14 were divided into 7 zones. Barrels 2 and 3 comprised zone 1. Barrels 4 and 5 comprised zone 2. Barrels 6 and 7 comprised zone 3. Barrels 8 and 9 comprised zone 4. Barrels 10 and 11 comprised zone 5. Barrels 12 and 13 comprised zone 6. Barrel 14 (die) comprised zone 14. The extruded melt strands were cooled by air on a 15 foot conveyer belt equipped with fans, and then pelletized. As a rule of thumb, it was expected that the films from pellets would have lower tensile strength than the powder-derived films since the PVOH resin suffers from additional thermomechanical degradation during the extra pass through the extruder.

However, the PVOH pellets made on the ZSK-30 twin-screw extruder had excellent cast film processability. Thin films were easily made from the pellets on the same Haake twin-screw film cast line used in Example 1. The barrel temperatures were set at 180, 190, 190 and 180 ° C. for zones 1, 2, 3 and 4 (die) respectively. The screw speed was maintained at 134 rpm. This film also crystallized very quickly. High quality water-soluble film was again made using the temperature profile set forth in Example 2.

The tensile properties were tested under the same conditions as set forth in Example 2. It was found that the pellet-derived film was slightly stronger than that powder-derived film. The pellet-derived film was also slightly more rigid and slightly less ductile than the powder-derived film.

The peak stress of the pellet-derived film is nearly twice that of the powder-derived film, reaching a high value of 120 MPa versus a 60 MPa for the powder-derived film. The modulus of the pellet-derived film was about 30% higher than the powder-derived film, reaching 2580 MPa, while the powder film had a modulus of 1800 MPa. The powder-derived film was a little more ductile giving slightly higher elongation-at-break. Due to the peak stress and its contribution to the film's overall tensile toughness as measured as the area under the tensile curve, the pellet-derived PVOH film had a 50% higher toughness than the powder-derived PVOH film.

PVOH film produced from the PVOH pellets was determined to be stronger and tougher- than powder-derived PVOH film. Unexpectedly, it showed an upgrade in tensile properties by subjecting the PVOH through more thermal processing. Typically, as a polymer is subjected to more thermomechanical stress, polymer degradation occurs which results in the loss of mechanical and other properties.

EXAMPLES 4–6

Next, three grades of PVOH from Air Products at fully and super hydrolyzed level, i.e. 98.8—98.8% and +99.3% hydrolysis were selected to determine whether they exhibited thermoplastic properties. Since all three grades had a high degree of hydrolysis, the three resins were selected based upon viscosity. The three grades were resins of low, medium and high viscosity. These grades ensured that the correlation between hydrolysis and molecular weight on thermoplastic processing could be determined. Representing these three grades were Air Products AIRVOL® 107, 125, and 165 of respectively low, medium and high solution viscosities (See Table 1). Wren these three grades of PVOH were extruded on the Haake extruder used in Example 1, it was discovered that none of these grades could be extruded similar to that of Nippon KP-06. These PVOH resins caused the extruder to plug up. When the ZSK-30 extruder-used in Example 3 was used, the same problems occurred. Therefore, PVOH films using PVOH having a high degree of hydrolysis could not be extruded, regardless of the viscosity of the resin.

EXAMPLES 7–17

Next, a broader comparison was done to determine the correlation of hydrolysis and viscosity of a particular PVOH resin versus the thermoplastic capability of the resin. In addition to the PVOH resins used in Examples 1 and 4 to 6, four other grades of AIRVOL® resin were used (AIRVOL® 203, 205, 523 and 540) along with three grades of DuPont ELVANOL® resin (ELVANOL® 51-05, 52-22 and 50-42). The four AIRVOL® and three ELVANOL® resins all are partially hydrolyzed (having a hydrolysis of between about 87 to about 90 percent), but varied viscosities. Table 1 is a chart of solution viscosity versus percent hydrolysis according to vendor data, for the selected grades of PVOH.

TABLE 1

| Manufacturer | Trade Name | % Hydrolysis | Viscosity 4% solution, 20° C. |
| --- | --- | --- | --- |
| Nippon Gohsei | KP-06 | 71–74 | 5–7 |
| Air Products | AIRVOL ® 125 | 99.3+ | 26–30 |
| | AIRVOL ® 165 | 99.3+ | 55–65 |
| | AIRVOL ® 107 | 98.0–98.8 | 5.4–6.5 |
| | AIRVOL ® 203 | 87.0–89.0 | 3–4 |
| | AIRVOL ® 205 | 87.0–89.0 | 5–6 |
| | AIRVOL ® 523 | 87.00–89.0 | 22–26 |
| | AIRVOL ® 540 | 87.0–89.0 | 40–50 |
| DuPont | ELVANOL ® 51-05 | 87.0–89.0 | 3–4 |
| | ELVANOL ® 52-22 | 87.0–89.0 | 22–26 |
| | ELVANOL ® 50-42 | 87.0–89.0 | 40–50 |

Each of the above grades of PVOH were extruded on a Werner & Pfleiderer ZSK-30 twin-screw extruder in order to determine melt processability.

It was not obvious to tell which grades of PVOH would demonstrate thermoplasticity from the percent hydrolysis and/or the solution viscosity. Of the eleven resins studied, only four grades of PVOH were determined to have thermoplastic processability: NG KP-06, ELVANOL® 51-05, AIRVOL® 205, and AIRVOL® 203. The melt strands of the KP-06 strands were colorless, the AIRVOL® grades were slightly yellow colored, and the ELVANOL® grade was yellow. For each of the four resins, the melt strands were transparent. The strands appeared very strong and brittle.

All of the other grades of PVOH were determined to not be thermoplastically processable. The extruded PVOH for the non-thermoplastic grades was severely discolored, due to thermal degradation. The strands had severe melt fracture, breakage, and/or bubble formation. After several minutes of extrusion, the degraded PVOH would begin to plug the die holes and the percent torque and pressure were observed to increase beyond the normal, safe operating range. The PVOH would spit and/or pop out of the die or no material would extrude at all, and the PVOH would begin to bridge at the feed throat. In some cases, the non-melt processable grades of PVOH would "freeze" and lock up the screws, triggering the extruder to shut off due to percent torque overload. The observed problems with extruding the non-thermoplastic grades of PVOH made the observation of the melt processable, thermoplastic grades of PVOH even more remarkable.

Table 2 shows the average extrusion data for each of the thermoplastic grades of PVOH and two of the non-thermoplastic grades of PVOH, ELVANOL® 52-22 and AIRVOL® 523, before the die holes were plugged.

TABLE 2

| Trade Name | Feed Rate (lb/hr) | Screw Speed (rpm) | % Torque | BARREL TEMPERATURE | | | | | | Zone 7 Temp (° C.) | Melt Temp (° C.) | Die Pres (PSI) |
| --- | --- | --- | --- | --- | --- | --- | --- | --- | --- | --- | --- | --- |
| | | | | 1 (° C.) | 2 (° C.) | 3 (° C.) | 4 (° C.) | 5 (° C.) | 6 (° C.) | | | |
| THERMOPLASTIC | | | | | | | | | | | | |
| KP-06 | 20.00 | 301 | 39.00 | 179 | 181 | 180 | 180 | 180 | 180 | 192 | 203 | 270 |
| AIRVOL ® 205 | 20.04 | 300 | 44.15 | 178 | 180 | 180 | 180 | 180 | 181 | 188 | 200 | 484 |
| ELVANOL ® 51-05 | 19.79 | 300 | 41.75 | 178 | 180 | 181 | 180 | 180 | 180 | 192 | 203 | 446 |
| AIRVOL ® 203 | 20.02 | 299 | 42.78 | 181 | 180 | 179 | 180 | 175 | 180 | 182 | 199 | 183 |
| NON-THERMOPLASTIC | | | | | | | | | | | | |
| AIRVOL ® 523 | 19.99 | 300 | 54.95 | 178 | 180 | 179 | 182 | 181 | 181 | 199 | 213 | 1386 |
| ELVANOL ® 52-22 | 20.01 | 301 | 55.09 | 181 | 180 | 179 | 180 | 180 | 180 | 198 | 218 | 1511 |

As shown in Table 2, the melt processable, thermoplastic grades had lower percent torque (at least 20% lower), melt temperature (at least 10° C. lower), and die pressure (over 65% lower), compared to the non-thermoplastic grades. Thus, the qualitative observation of melt processability was confirmed by extrusion data.

Extruded pellets produced on the ZSK-30 extruder from each of the thermoplastic grades of PVOH were also converted into thin film on the Haake extruder, following the same procedure used for Example 3. NG KP-06 appeared to show the best film processability, in terms of clarity, melt strength, and uniformity (with no visible gels). ELVANOL® 51-05 produced a very thin film (down to less than 0.2 mil) with excellent clarity. However, ELVANOL® 51-05 was not as "clean" as the KP-06 as shown by a few visible gels in the film. AIRVOL® 203 and 205 produced very thin films (drawn down to about 0.5 mil) with less clarity than NG KP-06 or ELVANOL® 51-05. The Air Products resins were even less "clean" with several gels in the film. The gels in the film for AIRVOL® grades made it more difficult to draw down to less than 0.5 mil, because of splitting due to gels.

The non-thermoplastic grades of PVOH, in either powder or extruded pellet form, could not be converted into film on the Haake extruder following the same procedure used for Example 3. No thin film could be produced for any of the non-melt processable grades. Severe discoloration and die pressure were observed. For some grades, totally black sheets of thick rigid plastic were produced. After several minutes, the thin slit in the film die plugged and no thin film could be collected.

EXAMPLES 18–27

In addition to hydrolysis, the commercial grade PVOH resins were tested to determine whether or not the molecular weight of the PVOH could be used to determine whether that particular resin was melt processable. The NG KP-06 resin, along with several of the AIRVOL® and ELVANOL® resins were used. Gel permeation chromatography (GPC) results (obtained from American Polymer Standard Corporation, Mentor, Ohio) for the number-average molecular weight ($M_n$), the weight-average molecular weight ($M_w$) and the Z-average molecular weight ($M_z$) of the PVOH resins, in either powder or pellet form, are shown in Table 3.

TABLE 3

| Trade Name | Form | $M_n$ | $M_w$ | $M_z$ | Polydisperity ($M_w/M_n$) |
| --- | --- | --- | --- | --- | --- |
| MELT PROCESSABLE | | | | | |
| KP-06 | powder | 5,150 | 8,750 | 12,800 | 1.71 |
| AIRVOL ® 205 | powder | 25,000 | 46,500 | 74,450 | 1.86 |
| ELVANOL ® 51-05 | powder | 22,350 | 45,850 | 75,900 | 2.05 |
| AIRVOL ® 203 | powder | 18,400 | 32,500 | 49,300 | 1.77 |
| KP-06 | pellets | 7,100 | 10,850 | 15,000 | 1.53 |
| AIRVOL ® 205 | pellets | 30,750 | 52,400 | 85,700 | 1.70 |
| ELVANOL ® 51-05 | pellets | 27,650 | 51,950 | 85,000 | 1.88 |
| AIRVOL ® 203 | pellets | 22,550 | 36,800 | 54,450 | 1.63 |
| NOT MELT PROCESSABLE | | | | | |
| AIRVOL ® 523 | pellets | 61,900 | 148,300 | 296,900 | 2.40 |
| ELVANOL ® 52-22 | pellets | 55,900 | 143,400 | 302,000 | 2.57 |

The thermoplastic grades of PVOH powder had an average $M_w$ ranging from 8,750 g/mole to 46,500 g/mole and $M_w/M_n$ ranging from 1.71 to 2.05. The same grades of PVOH, after extrusion and pelletizing on the ZSK-30 extruder, retained thermoplasticity and film processability. The extruded pellets had an average $M_w$ ranging from 10,850 g/mole to 52,400 g/mole and $M_w/M_n$ ranging from 1.63 to 1.88. The non-thermoplastic grades of PVOH, however, had significantly higher $M_w$ at 148,300 and 143,400 and higher $M_w M_n$ at 2.40 and 2.57.

Interestingly, after twin-screw extrusion, the $M_w$ of the melt processable grades of PVOH increased and the $M_w/M_n$ decreased. Typically, after extrusion, a polymer would have been expected to undergo degradation, resulting in reduced $M_w$ and increased $M_w/M_n$.

EXAMPLES 28–39

Finally, the commercial grade PVOH resins were tested to determine whether or not the melt viscosity of the PVOH could be used to determine whether that particular resin w as melt processable. Again, the NG KP-06 resin, along with several of the AIRVOL® and ELVANOL® resins were used. At a shear rate of 500 s$^{-1}$, the apparent melt viscosity of the thermoplastic and non-thermoplastic grades of PVOH were significantly different. Table 4 shows the apparent melt viscosity at a shear rate of 500 s$^{-1}$ for PVOH powder and pellets produced on the ZSK-30 extruder.

TABLE 4

| Trade Name | Form | Melt Viscosity (Pa · s) |
|---|---|---|
| MELT PROCESSABLE | | |
| KP-06 | powder | 717 |
| KP-06 | pellets | 686 |
| ELVANOL ® 51-05 | powder | 796 |
| ELVANOL ® 51-05 | pellets | 1337 |
| AIRVOL ® 203 | powder | 311 |
| AIRVOL ® 203 | pellets | 490 |
| AIRVOL ® 205 | powder | 821 |
| AIRVOL ® 205 | pellets | 1034 |
| NOT MELT PROCESSABLE | | |
| AIRVOL ® 523 | powder | 4010 |
| ELVANOL ® 52-22 | powder | 1684 |
| ELVANOL ® 50-42 | powder | 2943 |
| ELVANOL ® 52-22 | pellets | 2508 |

Unmodified PVOH with a melt viscosity greater than about 1500 Pa·S was not melt processable and grades with a melt viscosity less than 1500 Pa·S were melt processable.

As can be seen from the above-examples, not all grades of commercially available PVOH resins are melt processable. In fact, only four of the eleven grades tested exhibited thermoplastic characteristics. However, by using the hydrolysis, the molecular weight, the solution viscosity or the melt viscosity of the PVOH resins, it is possible to determine which grades of PVOH are likely to be melt processable.

However, due to the current number and type of PVOH grades, it is difficult to determine the exact ranges of melt processability for all potential PVOH resins. For the current grades, it is possible to determine the hydrolysis, the molecular weight and the solution viscosity for those grades which definitely are melt-processable, and for those grades which are not melt processable. However there is a middle area for these parameters for which no grades of PVOH are currently available.

For example, while partially hydrolyzed PVOH resins (less than 90 percent) and fully hydrolyzed resins (greater than 95 percent) are available, there are no commercially available resins in) between (having 90 to 95 percent hydrolysis). Therefore, it is difficult to determine the exact ranges of melt processability for all unmodified PVOH resins based on the percent hydrolysis. Additionally, grades of PVOH having a weight-average molecular weight of less than 60,000 are melt processable, while grades having a weight-average molecular weight greater than 140,000 are not melt processable. Therefore, it is difficult to determine the exact ranges of melt processability for all unmodified PVOH resins based on the weight-average molecular weight. Finally, for solution viscosity, grades having a solution viscosity less than 10 cp are melt processable while grades having a solution viscosity greater than 20 cp are not, leaving the range from 10–20 cp uncertain. However, it is possible to determine the exact range of melt processability using melt viscosity. Those grades having a melt viscosity less than about 1500 Pa·s are melt processable while grades having a melt viscosity greater than about 1500 Pa·s are not melt processable.

Therefore, these results have shown unmodified PVOH may be used in the absence of any chemical modification or grafting of the PVOH, or without the addition of any plasticizing agent or water to produce quality thermoplastic films and fibers This unmodified PVOH avoids the additional process steps associated with chemical modification or grafting and the problems associated with the use of plasticizers.

We claim:

1. A method of making a substantially water-free. thermoplastic fiber comprising:
   extruding a substantially water-free unmodified polyvinyl alcohol into a fiber.

2. The method of claim 1, wherein a 4% in water solution of the unmodified polyvinyl alcohol at 20° C. has a viscosity of less than about 20 centipoise.

3. The method of claim 2, wherein a 4%c in water solution of the unmodified polyvinyl alcohol at 20° C has a viscosity of less than about 10 centipoise.

4. The method of claim 1, wherein the unmodified polyvinyl alcohol has a hydrolysis of less than about 95%.

5. The method of claim 4, wherein the unmodified polyvinyl alcohol has a hydrolysis of less than about 90%.

6. The method of claim 1, wherein the unmodified polyvinyl alcohol has a weight-average molecular weight of less than about 140,000.

7. The method of claim 6, wherein the unmodified polyvinyl alcohol has a weight-average molecular weight of less than about 60,000.

8. The method of claim 1, wherein the unmodified polyvinyl alcohol has a melt viscosity at a shear rate of 500 $s^{-1}$ of less than about 1500 Pa·s.

9. The method of claim 1, wherein the fiber has less than about 0.5 percent by weight of water.

10. The method of claim 1, wherein the fiber is extruded at a temperature of less than about 200° C.

11. The method of claim 1, wherein the fiber has less than about 2.0 percent by weight of water.

12. The method of claim 1, wherein the fiber has less than about 1.0 percent by weight of water.

13. A method of making a thermoplastic fiber comprising:
    extruding an unmodified polyvinyl alcohol into a fiber,
    wherein the fiber has less than about 2.0 percent by weight of water.

14. The method of claim 13, wherein a 4% in water solution of the unmodified polyvinyl alcohol at 20° C. has a viscosity of less than about 20 centipoise.

15. The method of claim 14, wherein a 4% in water solution of the unmodified polyvinyl alcohol at 20° C. has a viscosity of less than about 10 centipoise.

16. The method of claim 13, wherein the unmodified polyvinyl alcohol has a hydrolysis of less than about 95%.

17. The method of claim 16, wherein the unmodified polyvinyl alcohol has a hydrolysis of less than about 90%.

18. The method of claim 13, wherein the unmodified polyvinyl alcohol has a weight-average molecular weight of less than about 140,000.

19. The method of claim 18, wherein the unmodified polyvinyl alcohol has a weight-average molecular weight of less than about 60,000.

20. The method of claim 13, wherein the unmodified polyvinyl alcohol has a melt viscosity at a shear rate of 500 $s^{-1}$ of less than about 1500 Pa·s.

21. The method of claim 13, wherein the fiber is extruded at a temperature of less than about 200° C.

* * * * *

UNITED STATES PATENT AND TRADEMARK OFFICE
CERTIFICATE OF CORRECTION

PATENT NO. : 6,197,238 B1 Page 1 of 1
DATED : March 6, 2001
INVENTOR(S) : James Hongxue Wang, David Michael Schertz and William S. Pomplun It is certified that error appears in the above-identified patent and that said Letters Patent is hereby corrected as shown below:

Column 7,
Line 48, delete "Wren" and substitute -- When --.
Line 62, delete "thernoplastic" and substitute -- thermoplastic --.

Column 10,
Line 47, delete "$M_wM_n$" and substitute -- Mw/Mn --.
Line 59, delete "w as" and substitute -- was --.

Column 12,
Line 14, delete "c" after "%".

Signed and Sealed this

Eighteenth Day of February, 2003

JAMES E. ROGAN
*Director of the United States Patent and Trademark Office*